United States Patent

[11] 3,584,917

[72] Inventor Ralph H. Ullenberg
 1580 Highland Drive, Elm Grove, Wis. 53122
[21] Appl. No. 858,409
[22] Filed Sept. 16, 1969
[45] Patented June 15, 1971

[54] SPILL PANS FOR DUMP TRUCKS
 5 Claims, 6 Drawing Figs.
[52] U.S. Cl. .................................................. 298/7
[51] Int. Cl. .................................................. B60p 1/26
[50] Field of Search ....................................... 298/7; 296/57, 58, 60; 193/4, 5

[56] References Cited
UNITED STATES PATENTS
1,961,307 6/1934 Stauffer .......................... 193/4
3,395,937 8/1968 Hoyerman .................... 298/7 (X)

Primary Examiner—Trygve M. Blix
Assistant Examiner—Carl A. Rutledge
Attorney—Alter, Weiss & Whitesel ABSTRACT: A spill pan is provided for dump trucks to keep the material being unloaded from the interfering with rear wheels. The spill pan rotates about the forward lip of the pan. This forward lip is kept juxtaposed to the rear edge of the track bed.

PATENTED JUN 15 1971 3,584,917

INVENTOR
RALPH H. ULLENBERG

BY Alter and Weiss
ATTORNEYS

SPILL PANS FOR DUMP TRUCKS

My invention relates to hinged dump bodies of dump trucks, and more particularly to spill pans for use in discharging material from the dump body mounted onto a truck.

The prime object of my invention is to provide devices that will permit material from the body of dump trucks to be discharged over the rear axle and even over a trailing axle (tag axle), mounted to the truck frames behind the rearmost drive axle.

Another object of my invention is to provide devices that may be hingedly mounted to truck body frames rearward from the truck chassis rear axles.

Still another object of my invention is to design the devices of the character described that are hingedly supported to rest on the rearward end of the truck chassis.

A further object of my invention is to design the spill pans so they may be resiliently supported to prevent the "bouncing" action while the truck is in motion.

A still further object is to provide spill pans that are hingedly supported to remain in place at all times, while the truck body is dumped and will raise and lower with the movement of the "tag axle."

It is manifest to anyone familiar with the unloading of a dump truck, or the like, that the prime object is to guide the material being discharged in a manner to prevent the material from imbedding the rear drive wheels, and it is the purpose of my invention to accomplish this function.

The device is simple in construction, automatic in its operation, and highly efficient for the purpose for which it is intended.

Other and further objects of the invention will become more apparent as the description proceeds, when taken in conjunction with the drawings, in which.

Figure 1:
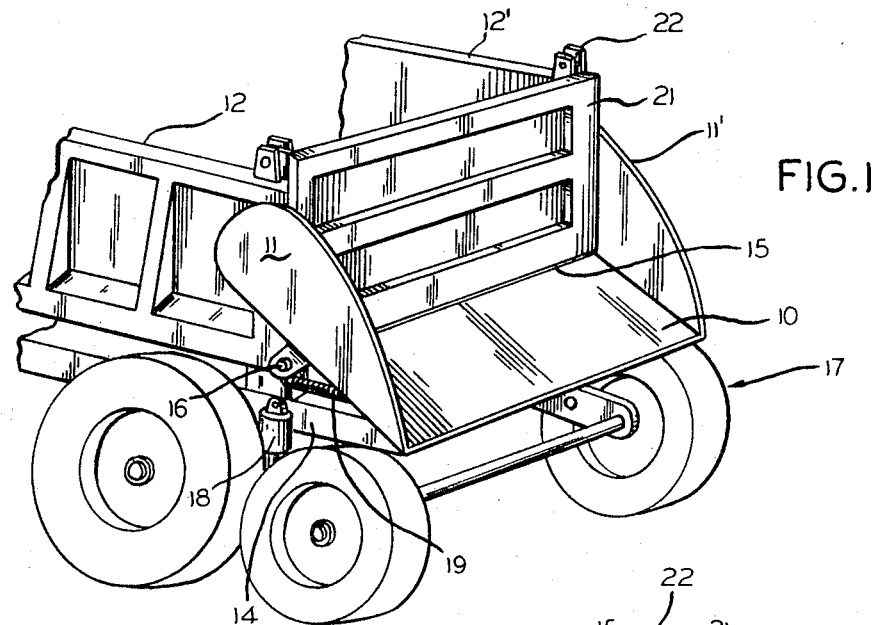
FIG. 1, is a fragmentary perspective view of the rear portion of the dump truck, with the device constituting my invention, hingedly mounted thereon.
Figure 3:
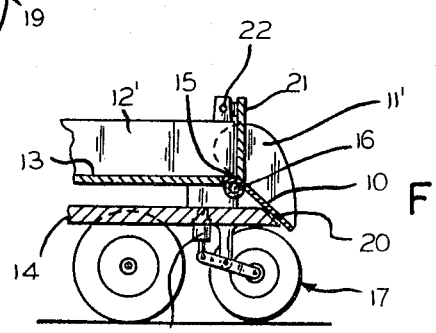
FIG. 3, is a fragmentary cross section of the device attached to the truck, showing the body of the truck in a downward position, while the material is being conveyed.
Figure 2:
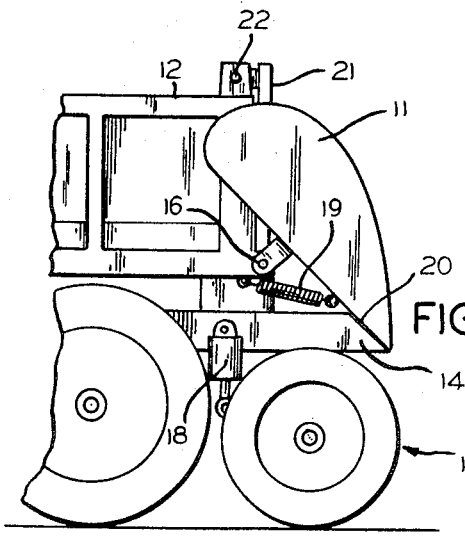
FIG. 2, is a partial side view of the device mounted onto the dump truck.
Figure 4:
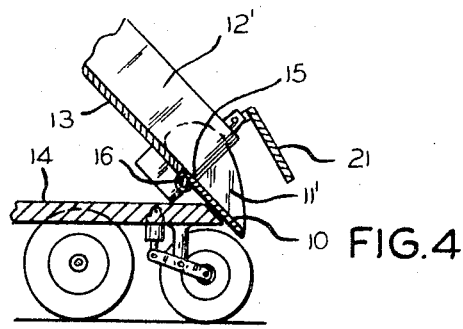
FIG. 4, is a similar view as shown in FIG. 3, with the truck body in a raised, or "dumping" position.

Similar characters of reference indicate corresponding parts and features throughout the several views, and referring now to the same, the character 10, shows a spill pan portion equipped with a pair of vertical sideplates 11 and 11', arcuately formed at their forward edges, which slidably contact the sidewalls 12 and 12' respectively of the body of the dump truck which is provided with a bottom plate 13 and mounted onto a conventional chassis, generally shown as 14.

The spill pan 10 has radially formed forward lip 15 encircling a shaft 16, mounted in any efficient manner in bearings supported by the truck body plates, adjacent to the bottom plate 13.

The tag axle assembly, generally shown as 17, is free to move as shown at 18, and in no manner interferes with the spill pan 10 during its operation.

There is an expansion spring 19 shown as a means of retaining the spill pan 10 in contact with the bevelled edge 20 at the rearward end of the chassis 14. Obviously the dump truck body may be equipped with a conventional gate 21, hingedly supported as shown at 22, at the upper rearward end of the sidewalls 12 and 12' in any efficient manner, so it will be disposed between the sidewalls 11 and 11' of the spill pan 10.

Figures 5, 6:
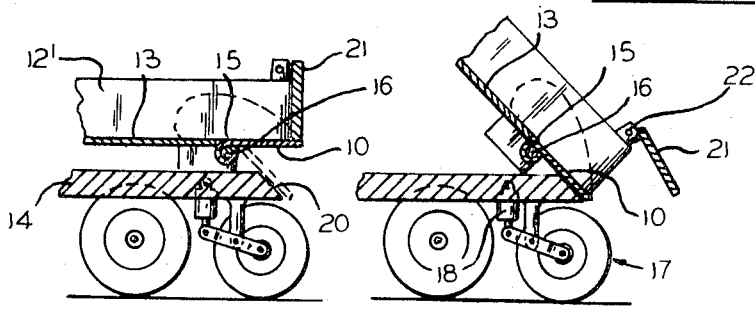
FIG. 5, is a fragmentary cross-sectional modified view of a portion of the dump truck, with the spill pan, forming a part of the truck body, in a raised position.
FIG. 6, is a similar view as shown in FIG. 5, with the truck body in a dumping position.

In operation the spill pan rotates about axis 16 as the dump truck body is raised to keep the forward lip of the pan contiguous to the rear of the dump truck bed. In the embodiment of FIGS. 5 and 6, the spill pan 10 can be lowered while the truck bed is in a horizontal position.

From the above description it will become apparent that the spill pan covered by my invention is simple in construction and easy to apply, and although I have shown a specific construction and arrangement of the features, I am fully cognizant of the fact that many changes may be made without effecting the operativeness of the device, and I reserve the rights to make such changes as I may deem necessary without departing from the spirit of my invention, or the scope of the appended claims.

Having thus described my invention, what I claim and desire to secure by letters patent in the United States, is:

1. A spill pan for use on a dump truck to keep the rear wheels of the truck free from the material being discharged from the truck,
   said truck comprising a dump body pivotally attached to the chassis of said truck to enable lifting the forward portion of said dump body to discharge the material carried in said body,
   said body being defined by a bottom bed and oppositely disposed sidewalls,
   said spill pan comprising means for transferring material from said bed to an area which is behind the rear wheels of said dump truck,
   said spill pan comprises a bottom plate and oppositely disposed sidewalls extending upward from said bottom plate,
   said sidewalls extend beyond the sidewalls of said truck and along the length of said bottom plate,
   said sidewalls of said spill pan fitting contiguously to the outside of the sidewalls of the said truck, whereby the sidewalls of said truck nest within the sidewalls of said spill pan,
   coupling means for coupling said spill pan to said truck,
   said coupling means comprising means for pivotally coupling said spill pan to the dump body of said dump truck whereby the front of the bottom plate of said spill pan is maintained contiguous to the bed of said dump truck,
   said means for pivotally coupling said spill pan comprises an axle shaft extending through the sidewalls of said dump truck and a forward lip on said bottom plate of said spill pan encircling said axle shaft.

2. The spill pan arrangement of claim 1 wherein spring means are provided for holding the bottom of the bottom plate of said spill pan against the chassis of said chassis.

3. The spill pan arrangement of claim 1 including means for maintaining said spill pan at an angle to the normally horizontal bed of said truck, and wherein said angle between said bottom plate of said spill pan and said bed of said truck is 180° when said dump body is lifted to place said dump body in the discharge position.

4. The spill pan arrangement of claim 1 including means for maintaining the spill pan in a position at an angle of 180° to the bed of said truck thereby extending the bend of said truck,
   means for dropping the rear of the bottom plate of said spill pan to form an angle to the horizontal.

5. The spill pan arrangement of claim 1 wherein the rear axle of said truck is a tag axle.